(12) United States Patent
Kawatoko et al.

(10) Patent No.: US 8,441,253 B2
(45) Date of Patent: May 14, 2013

(54) MEASURING APPARATUS HAVING CHARGE CONTROL CIRCUIT

(75) Inventors: Osamu Kawatoko, Kawasaki (JP); Toshihiro Hasegawa, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 49 days.

(21) Appl. No.: 13/216,845

(22) Filed: Aug. 24, 2011

(65) Prior Publication Data
US 2012/0049840 A1   Mar. 1, 2012

(30) Foreign Application Priority Data

Aug. 25, 2010 (JP) ................................. 2010-188401

(51) Int. Cl.
*G01V 7/14* (2006.01)
(52) U.S. Cl.
USPC ................. 324/207.24; 324/207.17; 33/811
(58) Field of Classification Search ............ 324/207.17, 324/207.24, 157
See application file for complete search history.

(56) References Cited

U.S. PATENT DOCUMENTS 5,102,471 A * 4/1992 Sasaki ..................... 136/244

FOREIGN PATENT DOCUMENTS

JP    U-1-81507    5/1989

* cited by examiner

*Primary Examiner* — Jay Patidar
(74) *Attorney, Agent, or Firm* — Oliff & Berridge, PLC

(57) ABSTRACT

A measuring apparatus includes: a measuring circuit configured to carry out predetermined processing for the measurement result of an object to be measured; a communication control circuit configured to generate output data to be output externally depending on the processing result of the measuring circuit; a power source circuit having a charging element configured to supply power to the measuring circuit and the communication control circuit; an output circuit having open-drain output terminals configured to externally output the output data generated in the communication control circuit; and a charge control circuit configured to charge the charging element at the timing when the output data is not output externally, the open-drain output terminals of the output circuit being used as the input terminals thereof.

4 Claims, 3 Drawing Sheets

US 8,441,253 B2

MEASURING APPARATUS HAVING CHARGE CONTROL CIRCUIT

CROSS-REFERENCE TO RELATED APPLICATION(S)

This application is based upon and claims the benefit of priority from Japanese Patent Application No. 2010-188401, filed on Aug. 25, 2010, the entire contents of which are incorporated herein by reference.

BACKGROUND

1. Field of the Invention

The present invention relates to a measuring apparatus for obtaining a measured value by processing a measurement result, such as the displacement of an object to be measured, using an electric signal and for outputting the measured value to an external device.

2. Description of the Related Art

Small-size displacement measuring apparatuses, such as a digital vernier caliper, a digital micrometer and a digital indicator, have been used conventionally to measure the displacement of an object to be measured, such as the displacement in the length and width thereof. Since these measuring apparatuses digitally indicate a measured value as the displacement measurement result of the object to be measured, the measured value can be read quickly. Furthermore, in the case that the measurement result is output to an external device, the measurement result can be subjected to arithmetic processing in the external device. In the case that measured data inside such a measuring apparatus is output externally, the measuring apparatus is primarily connected to the external device via a dedicated interface. This kind of measuring apparatus is equipped with a solar cell in some cases so that battery replacement is unnecessary while the apparatus is used (refer to JP-UM-A-H01-81507). Such a conventional solar cell type measuring apparatus has been designed so as to operate within the power range of a solar cell panel mounted thereon.

However, when data transfer is carried out using the dedicated interface, the power consumed for the data transfer is not smaller than the power consumed for the measurement operation for an object to be measured. In the case that sufficient illuminance is not obtained at a site where measurement is taken place, the power of the solar cell becomes insufficient and system down may occur in the measuring apparatus.

SUMMARY

In consideration of these problems, an object of the present invention is to provide a measuring apparatus capable of stable operation even at data transfer time.

For the purpose of attaining the above-mentioned object, according to an aspect of the invention, there is provided a measuring apparatus including: a measuring circuit configured to carry out predetermined processing for the measurement result of an object to be measured; a communication control circuit configured to generate output data to be output externally depending on the processing result of the measuring circuit; a power source circuit having a charging element configured to supply power to the measuring circuit and the communication control circuit; an output circuit having open-drain output terminals configured to externally output the output data generated in the communication control circuit; and a charge control circuit configured to charge the charging element at the timing when the output data is not output externally, the open-drain output terminals of the output circuit being used as the input terminals thereof.

The charge control circuit may include: a voltage detection section configured to judge whether the charged voltage of the charging element is higher than a predetermined reference voltage; and a charge switch section configured to end the charging operation for the charging element based on the judgment result of the voltage detection section.

The output circuit may include NMOS transistors, the sources of which are grounded and the drains of which are used as connection terminals for connection to an external device. Further, the drains of the NMOS transistors may be pulled up by the power source voltage of the external device, the gates of the NMOS transistors may be driven by the output data output from the communication control circuit to output the output data to the external device, and the charge control circuit may charge the charging element using the power source voltage of the external device supplied to the drain of the NMOS transistor.

The power source circuit may further include a solar cell for charging the charging element.

With the present invention, the measuring apparatus can obtain power via a dedicated interface being used for the transfer of measured data, whereby the charging element mounted on the measuring apparatus can be charged. Hence, stable power can be supplied to the measuring apparatus at all times, whereby the reliability of measured data transfer operation can be ensured even when illuminance is low.

BRIEF DESCRIPTION OF THE DRAWINGS

The present invention will become more fully understood from the detailed description given herein below and the accompanying drawing which is given by way of illustration only, and thus is not limitative of the present invention and wherein.

DETAILED DESCRIPTION OF THE INVENTION

A preferred embodiment of the present invention will be described below referring to the accompanying drawings.

Figure 1:
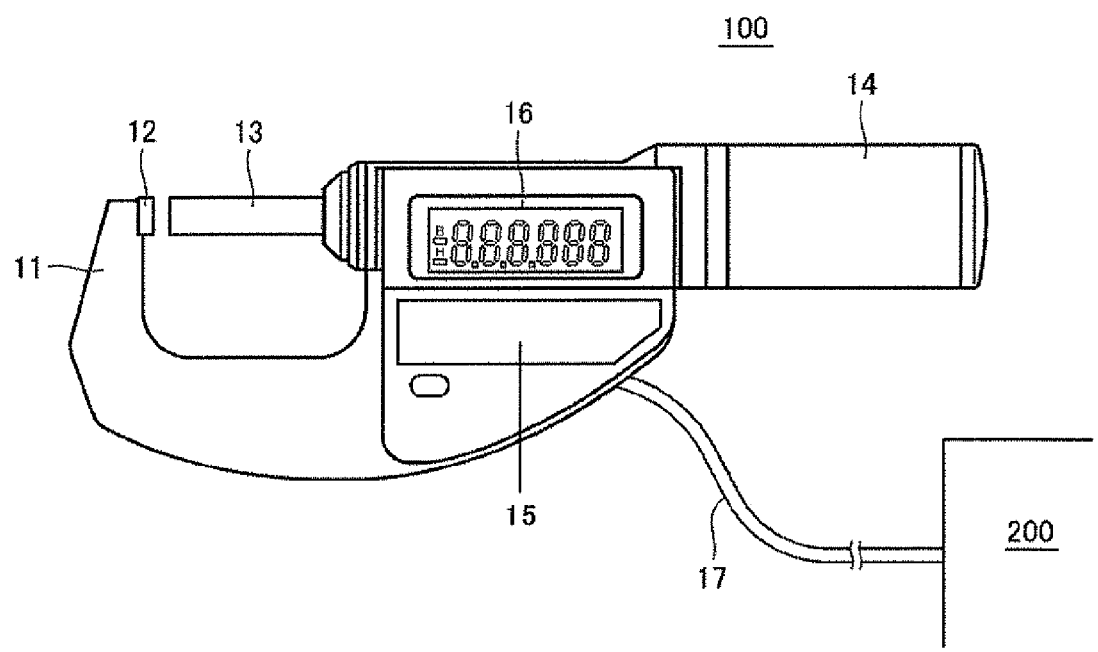
FIG. 1 is a view showing an overall configuration of a measuring apparatus according to an embodiment of the present invention.

FIG. 1 is a front view showing an overall configuration of a measuring apparatus according to an embodiment of the present invention. FIG. 1 shows a measuring apparatus 100 equipped with a function for measuring an object to be measured and an external device 200 to which the measurement result of this measuring apparatus 100 is input and in which necessary data processing is carried out. A micrometer is shown as an example of the measuring apparatus 100. However, the measuring apparatus 100 should only be an apparatus in which the measurement result thereof is digitized and output externally, and is applicable to various small-size displacement measuring apparatuses, such as a vernier caliper and an indicator.

The measuring apparatus 100 shown in FIG. 1 is configured as described below. The measuring apparatus 100 is equipped with a nearly U-shaped frame 11, an anvil 12 secured to the frame 11, a spindle 13 disposed so as to be opposed to the anvil 12, and a thimble 14 that is used to move the spindle 13 toward the anvil 12. The thickness of an object to be measured can be measured by holding the object to be measured between the anvil 12 and the spindle 13. Furthermore, the measuring apparatus 100 is provided with a solar cell panel 15. The power generated by this solar cell panel 15 is used when the displacement of the object is measured. The measurement result of the object to be measured is digitally indicated on a display section 16 and output to the external device 200 via a connection section 17.

The external device 200 is provided with N-channel open-drain connection terminals and a power source described later, these being not shown in FIG. 1. The external device 200 carries out, for example, a variety of arithmetic processing for the measurement result of the object to be measured, the measurement result being input thereto.

Figure 2:
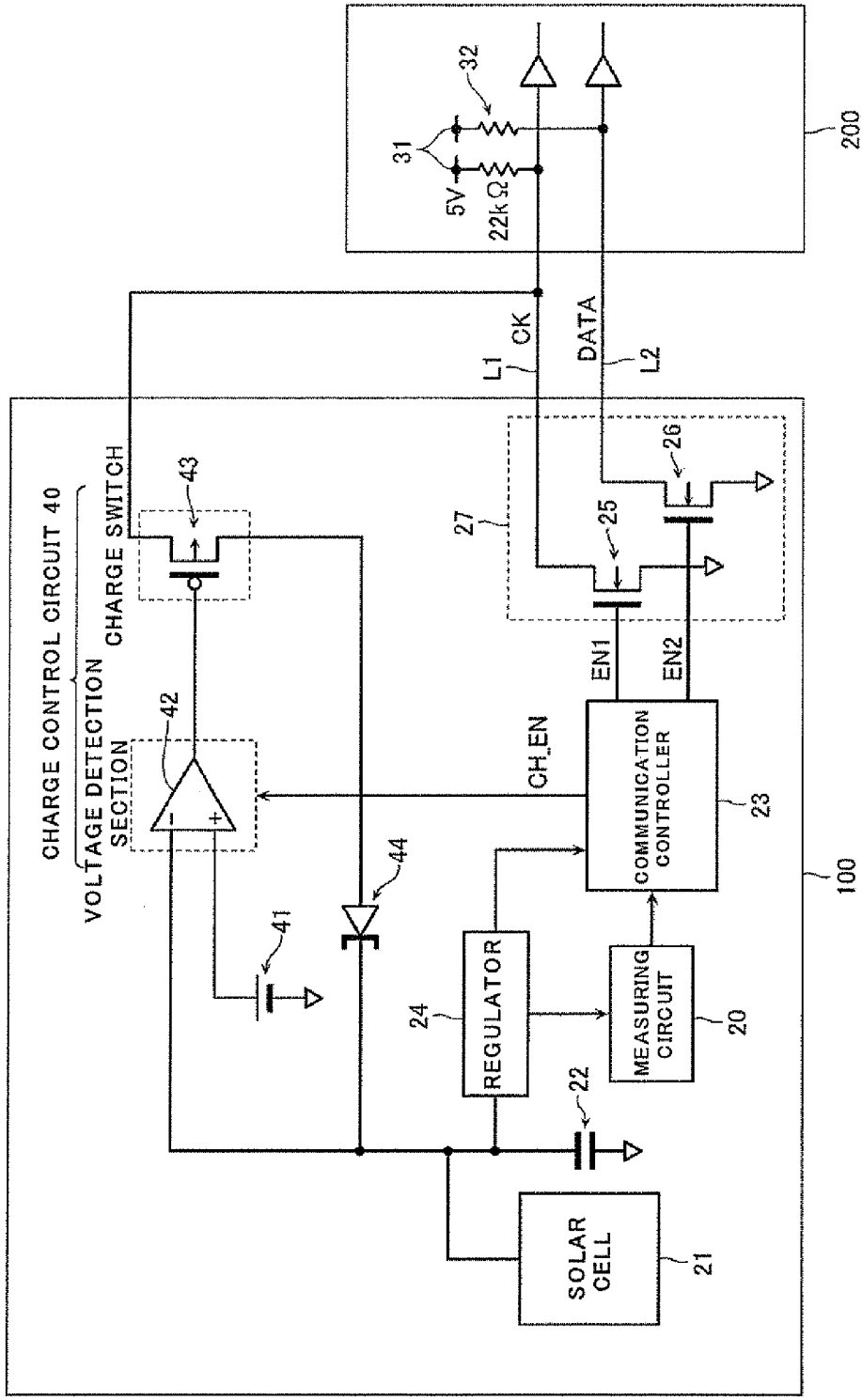
FIG. 2 is an overall block diagram showing the configuration of the measuring apparatus according to the embodiment.

The interiors of the measuring apparatus 100 and the external device 200 are configured as shown in FIG. 2. The measuring apparatus 100 is equipped with a solar cell 21 used as a power source when measurement operation is carried out and a capacitor 22 (a charging element) charged by the solar cell 21 to supply power when the measuring apparatus 100 operates. The solar cell 21 generates power using a photoelectromotive force, for example, and charges the capacitor 22. In addition, the measuring apparatus 100 is equipped with a measuring circuit 20 for carrying out processing for measuring the object to be measured, a communication controller 23 for controlling the output operation of the measurement result of the object to be measured, and a regulator 24 for converting the charge stored in the capacitor 22 into a voltage to be used inside the measuring circuit 100 to drive the communication controller 23. The communication controller 23 is used to control the generation of output data to be output externally depending on the result of the processing in the measuring circuit 20 and is also used to control the charging operation of the capacitor 22 described later.

The communication controller 23 outputs the measurement result to the external device 200 via an N-channel open-drain output circuit 27. The output circuit 27 is formed of two NMOS transistors 25 and 26 each having an N-channel open-drain output terminal. Enable signals EN1 and EN2 from the communication controller 23 are input to the gates of the NMOS transistors 25 and 26, respectively, and the sources thereof are grounded. The drains of the NMOS transistors 25 and 26 serve as output terminals to be connected to the external device 200. The drains of the NMOS transistors 25 and 26 are connected to the external device 200 via signal lines L1 and L2, respectively. The voltage of the signal line L1 connected to the drain of the NMOS transistor 25 is output as a clock signal CK, and the voltage of the signal line L2 connected to the drain of the NMOS transistor 26 is output as a data signal DATA.

A power source 31 (for example, 5 V) is connected to the N-channel open-drain input terminals of the external device 200 via resistors 32 (for example, 22 kΩ). A variety of processing are carried out for the signals of the measurement result input from the input terminals.

Figure 3:
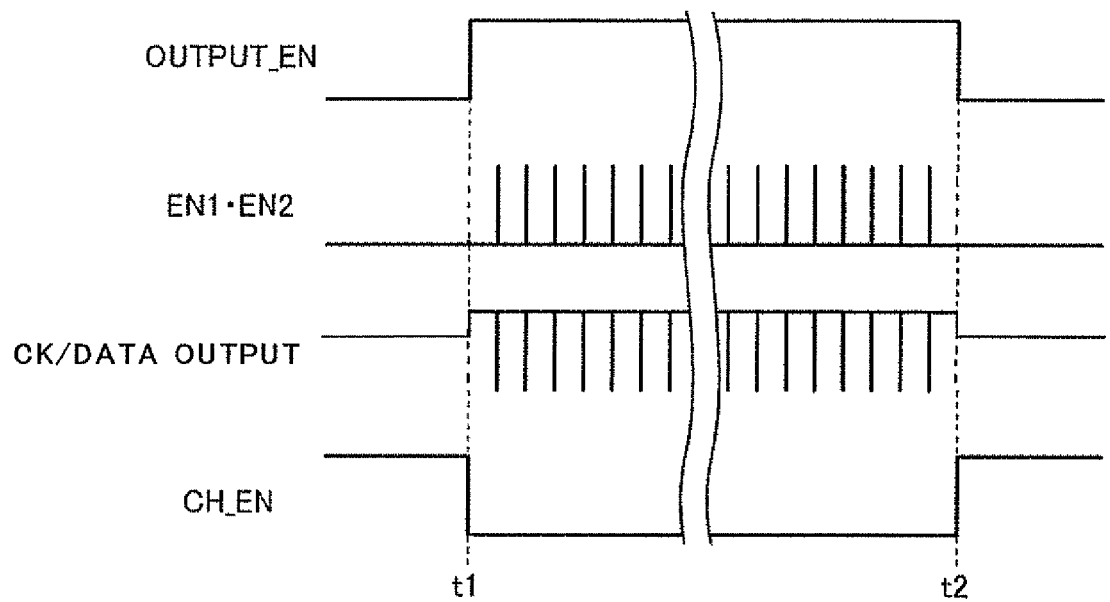
FIG. 3 is a waveform diagram showing a procedure for carrying out the operation of the measuring apparatus according to the embodiment.

Data transfer operation using the N-channel open-drain connection terminals will be described below referring to FIGS. 2 and 3. FIG. 3 is a waveform diagram showing a procedure for carrying out the operation of the measuring apparatus 100 according to the embodiment.

Before data transfer operation starts (before time t1), the signal lines L1 and L2 are in a charged state at all times by virtue of the power source 31. Hence, the clock signal CK and the data signal DATA, corresponding to the voltages of the signal lines L1 and L2, are HIGH. At time t1, an output enable signal OUTPUT_EN is raised from LOW to HIGH. This output enable signal OUTPUT_EN, not shown in FIG. 2, is a signal being used inside the communication controller 23 and becomes HIGH when measured data is output to the external device 200.

After data output starts, the enable signals EN1 and EN2 corresponding to data to be transferred are output from the communication controller 23 to the gates of the NMOS transistors 25 and 26. When the enable signals EN1 and EN2 become HIGH, the NMOS transistors 25 and 26 are conducted, and the signal lines L1 and L2 become LOW. This Low level is input to the external device 200 as pulse signals. When the output enable signal OUTPUT_EN becomes LOW at time t2, data transfer operation is ended.

In the displacement measurement of an object, the voltage used in the measuring circuit 100 is different from the voltage used in the external device 200 in some cases. For example, there is a case in which the external device 200 operates at a voltage of 5 V, but the measuring circuit 100 operates at a voltage (for example, 1.5 V) lower than the voltage of the power source 31 of the external device 200. In this case, even if a 1.5 V signal is directly output to the external device 200, there is a danger that the signal cannot be read correctly. However, by the connection to the external device 200 using the above-mentioned N-channel open-drain output terminals, data to be transmitted to the external device 200 through the signal lines L1 and L2 becomes 5 V signals even if the enable signals EN1 and EN2 have a voltage of 1.5 V. As a result, data can be transferred normally even if the voltage used in the measuring circuit 100 is different from the voltage used in the external device 200.

However, even if the measuring circuit 100 carries out data transfer using a dedicated interface, such as the N-channel open-drain output terminals, since the current through a pull-up resister of a requested input terminal is supplied from the charging element of the measuring circuit 100, the power consumed for the data transfer is larger than that consumed for the measurement operation for the object to be measured. In the case that no sufficient illuminance is obtained at a site where measurement is taken place, the power of the solar cell 21 becomes insufficient and system down may occur in the measuring apparatus.

For the purpose of solving this problem, the measuring apparatus 100 according to the embodiment has a configuration described below. The measuring apparatus 100 has a charge control circuit 40 for introducing the power of the external device 200 via the N-channel open-drain output terminals and for controlling the operation for charging the capacitor 22. The charge control circuit 40 is provided with a voltage detection section for judging whether the capacitor 22 is in a sufficiently charged state so that measurement operation can be carried out by comparing the voltage of the capacitor 22 with the voltage of a reference voltage source 41, and a charge switch for ending the charge operation for the capacitor 22 on the basis of the output signal of the voltage detection section. The charge switch is formed of a PMOS transistor 43 and is conducted when the output signal of the voltage detection section is LOW, that is, when the capacitor 22 is not charged sufficiently. Furthermore, the charge switch is not conducted when the output signal of the voltage detection section is HIGH, that is, when the capacitor 22 is charged sufficiently. When the charge switch is conducted, the capacitor 22 is connected to the power source 31 of the external device 200 via the charge switch and a diode 44. When the charge switch is conducted, the capacitor 22 is charged by the power source 31. A Schottky barrier diode having a low forward voltage, for example, can be used as the diode 44.

In the measuring apparatus 100 according to the embodiment, the capacitor 22 can be charged by the power supplied from the solar cell 21 and can also be charged by the external device 200 via the signal line L1, the PMOS transistor 43 and the diode 44. The timing when the measuring apparatus 100 charges the capacitor 22 will be described below referring to FIGS. 2 and 3. In the waveform diagram shown in FIG. 3, a charge enable signal CH_EN is a signal changing complementarily to the output enable signal OUTPUT_EN. When the output enable signal OUTPUT_EN is HIGH, the charge enable signal CH_EN becomes LOW, and when the output enable signal OUTPUT_EN is LOW, the charge enable signal CH_EN becomes HIGH.

In the measuring apparatus 100 according to the embodiment, the output enable signal OUTPUT_EN is LOW before time t1 or after time t2 shown in FIG. 3, and the data signal DATA is not output externally. However, even in this state, the levels of the signal lines L1 and L2 remain raised. Furthermore, the charge enable signal CH_EN is HIGH before time t1 or after time t2. The charge control circuit 40 of the measuring apparatus 100 according to the embodiment receives the charge enable signal CH_EN being HIGH and charges the capacitor 22.

When the charge enable signal CH_EN is HIGH, the capacitor 22 is connected to the power source 31 of the external device 200 via the PMOS transistor 43 and the diode 44. The capacitor 22 is thus charged by the power source 31. The voltage detection section judges the charged state of the capacitor 22 by comparing the voltage of the reference voltage source 41 with the charged voltage of the capacitor 22. In the case that it is judged that the capacitor 22 is sufficiently charged to a voltage higher than the voltage of the reference voltage source 41 so that the measuring apparatus 100 can be operated, the output signal of the operational amplifier 42 of the voltage detection section is inverted and the PMOS transistor 43 becomes non-conductive. As a result, the voltage of the capacitor 22 can be controlled so as not to exceed the maximum rated voltage thereof.

Hence, in the measuring apparatus 100 according to the embodiment described above, when data is not output to the external device 200 from the N-channel open-drain output terminals, the capacitor 22 can be charged by the power source 31 provided in the external device 200 via the signal line L1. For this reason, power being stable at all times can be supplied to the measuring apparatus 100, and it is thus possible to provide the measuring apparatus 100 capable of ensuring the reliability of measurement operation even when illuminance is low.

Although the embodiment of the present invention has been described above, it will be understood that the present invention is not limited to the above-mentioned embodiment but can be subjected to various modifications, additions and combinations, etc. within a scope not departing from the gist of the present invention. For example, in the above-mentioned embodiment, although it has been described that the signal line connected to the capacitor 22 via the charge switch is the signal line L1 for outputting the clock signal CK, the capacitor 22 may be connected to the signal line L2 for outputting the data signal DATA. Furthermore, although it has been described that the voltage of the power source of the external device 200 is 5 V, the voltage can be changed to various voltages depending on the design of the external device 200. Even in the case that the drive voltage of the measuring apparatus 100 is the same as that of the external device 200, the present invention is applicable to the case, as a matter of course. In any case, the capacitor 22 of the measuring apparatus 100 can be charged via the signal lines L1 and L2 by the power source 31 provided in the external device 200, whereby stable power can be supplied to the measuring apparatus 100 at all times.

What is claimed is:

1. A measuring apparatus comprising:
   a measuring circuit configured to carry out predetermined processing for a measurement result of an object to be measured;
   a communication control circuit configured to generate output data to be output externally depending on the processing result of the measuring circuit;
   a power source circuit having a charging element configured to supply power to the measuring circuit and the communication control circuit;
   an output circuit having open-drain output terminals configured to externally output the output data generated in the communication control circuit; and
   a charge control circuit configured to charge the charging element at a timing when the output data is not output externally by the output circuit, the open-drain output terminals of the output circuit being used as input terminals of the charge control circuit.

2. The measuring apparatus according to claim 1, wherein the charge control circuit includes:
   a voltage detection section configured to judge whether the charged voltage of the charging element is higher than a predetermined reference voltage; and
   a charge switch section configured to end the charging operation for the charging element based on the judgment result of the voltage detection section.

3. The measuring apparatus according to claim 1, wherein:
   the output circuit includes NMOS transistors, the sources of the NMOS transistors are grounded and drains of the NMOS transistors are used as connection terminals for connection to an external device;
   the drains of the NMOS transistors are pulled up by a power source voltage of the external device;
   gates of the NMOS transistors are driven by the output data output from the communication control circuit to output the output data to the external device; and
   the charge control circuit charges the charging element using the power source voltage of the external device supplied to the drain of the NMOS transistor.

4. The measuring apparatus according to claim 1, wherein the power source circuit further includes a solar cell for charging the charging element.

* * * * *